(12) United States Patent
Krabbenhoeft (10) Patent No.: US 9,741,132 B2
(45) Date of Patent: Aug. 22, 2017

(54) METHOD FOR CORRECTING DEVIATIONS OF MEASURED IMAGE DATA

(71) Applicant: HEIDELBERGER DRUCKMASCHINEN AG, Heidelberg (DE)

(72) Inventor: Uwe-Jens Krabbenhoeft, Quarnbek (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/079,320

(22) Filed: Mar. 24, 2016

(65) Prior Publication Data

US 2016/0284101 A1 Sep. 29, 2016

(30) Foreign Application Priority Data

Mar. 24, 2015 (DE) .......................... 10 2015 205 275

(51) Int. Cl.
*G06K 9/00* (2006.01)
*G06T 7/40* (2017.01)
(Continued)

(52) U.S. Cl.
CPC .......... *G06T 7/408* (2013.01); *B41F 33/0036* (2013.01); *G01J 3/462* (2013.01);
(Continued)

(58) Field of Classification Search
None
See application file for complete search history.

(56) References Cited

U.S. PATENT DOCUMENTS

| 5,141,323 A | 8/1992 | Kipphan et al. |
| 7,515,267 B2 | 4/2009 | Ehbets et al. |
| (Continued) | | |

FOREIGN PATENT DOCUMENTS

| DE | 102004021599 A1 | 12/2005 |
| DE | 102010009226 A1 | 9/2010 |
| (Continued) | | |

OTHER PUBLICATIONS

Giorgianni, Edward J., et al., "Digital Color Management—Encoding Solutions Second Edition", 2008, pp. 303-323, pp. 395-407, pp. 411-415, Wiley & Sons Ltd., Chichester, West Sussex, UK.

*Primary Examiner* — Mark Roz
(74) *Attorney, Agent, or Firm* — Laurence A. Greenberg; Werner H. Stemer; Ralph E. Locher (57) ABSTRACT

A method of correcting measured image data deviations of an image inspection system determining image data using a single measuring head and image measuring unit, by using a computer, includes measuring color spectrums of color fields using the head and unit, creating a color set from color spectrums of the head and unit, calculating spectrums from overprinting color combinations for the head and unit using a color model and the respective color set, calculating Lab color values for the head and unit based on spectrums of the head and unit, determining deviations between color values of the head and unit for supporting points, adding determined deviations to the color values of the measuring unit at the supporting points, creating an ICC profile based on corrected color values of the measuring unit for converting imprecise measured values thereof into accurate color values, and correcting imprecisely measured values of the measuring unit using the profile.

13 Claims, 4 Drawing Sheets

(51) Int. Cl.
  *G01J 3/46* (2006.01)
  *G06T 7/00* (2017.01)
  *B41F 33/00* (2006.01)

(52) U.S. Cl.
  CPC .. *G06T 7/0008* (2013.01); *G06T 2207/10024* (2013.01); *G06T 2207/30144* (2013.01)

(56) References Cited

U.S. PATENT DOCUMENTS

| | | |
|---|---|---|
| 8,371,221 B2 | 2/2013 | Krabbenhoeft |
| 2013/0003063 A1 | 1/2013 | Headley et al. |

FOREIGN PATENT DOCUMENTS

| | | |
|---|---|---|
| EP | 0357986 A2 | 3/1990 |
| EP | 2033789 A2 | 3/2009 |

METHOD FOR CORRECTING DEVIATIONS OF MEASURED IMAGE DATA

CROSS-REFERENCE TO RELATED APPLICATION

This application claims the priority, under 35 U.S.C. §119, of German Patent Application DE 10 2015 205 275.3, filed Mar. 24, 2015; the prior application is herewith incorporated by reference in its entirety.

BACKGROUND OF THE INVENTION

Field of the Invention

The present invention relates to a method for correcting deviations of measured image data in an image inspection system, in which the image data are determined by both a single measuring head and an image measuring unit by using a computer.

The technical field of the invention is the field of electronic printing technology.

A common way of inspecting the print quality of printed substrates that have been produced is to examine them with the aid of a color measurement device. For that purpose, the printed substrates may either be inspected inside the printing press directly after the printing process or outside the printing press by using an external device. The measured values may then be compared to the measured values of an original to detect potential deviations. That evaluation may be done with the aid of a computer. If the deviations exceed acceptable tolerances, the settings of the printing press need to be changed to minimize the deviations. The examination of the representation of the colors, carried out by color measurement devices, is of particular importance. Basically two measurement processes are known for taking color measurements: colorimetric measuring and densitometric measuring. An important aspect in both methods is that the color measurement device needs to take accurate color measurements to be able accurately to determine color deviations.

European Patent Application EP 0 357 986 A2, corresponding to U.S. Pat. No. 5,141,323, discloses a color measurement device that has a three-color simultaneous measuring head for densitometric measurements and a further three-color simultaneous measuring head for colorimetric measurements. Alternatively, a common measuring head including six optoelectronic converters for simultaneous measurements may be used, with three color filters for densitometric measurements and three color filters for colorimetric measurements replaced in the optical paths thereof. The different color measurement systems exclusively serve to take accurate color measurements. A disadvantage of those systems that take accurate color measurements is that in most cases they can only examine individual dots on the printed substrate. As a consequence, the measuring process takes a long time. In color measurement devices provided outside the printing press, that requires a considerable amount of time as a result. In color measurement devices provided inside the printing press, an inspection of the entire printed image becomes impossible because in the printing press, the printing substrates are transported past the color measurement device at a very high speed and consequently only a short period of time is available for color measurements.

In order to eliminate that disadvantage, European Patent Application EP 2 033 789 A2 discloses a method for taking color measurements on printed substrates in printing presses by using at least one color measurement device that takes rather imprecise color measurements and one color measurement device that takes accurate color measurements. That invention is distinguished in that the measuring device for imprecise color measurements and the measuring device for accurate color measurements exchange data through a communication link and that those data are used to calibrate the color measuring device for imprecise color measurements by using the color measurement head for accurate color measurements.

European Patent Application EP 2 033 789 A2 proposes two possible calibration methods for the imprecise color measurement device: the first calibration method includes calculating the difference between two measurements with different inking levels. In that differential process, the quotient dE/dRGB=const, is calculated. However, that method is very complex and slow. Thus a second calibration method is proposed wherein a single spectral measurement of a solid area is taken to determine an inking level and a color model representing the relationship between spectrum and relative ink layer thickness is used to calculate a second inking level from the first inking level.

Such a color model is also known from German Patent Application DE 10 2010 009 226 A1, corresponding to U.S. Pat. No. 8,371,221, for instance, which discloses a method for controlling the application of ink in a printing press. That method is distinguished in that to determine the changed color application value, a required ink layer thickness change is calculated as a function of changes of the color values in a device-independent color space upon an ink layer thickness change at the location of the actual color value.

However, the two calibration methods known from European Patent Application EP 2 033 789 A2 have a number of disadvantages. The first disclosed calibration method is very slow and complex, whereas the second disclosed calibration method may only be used for solid areas and is less accurate than the first method because the second inking level is calculated from the first measured inking level. Thus in the context of the fundamental concept of using a much more accurate but slow measuring device to calibrate an image measuring device that is imprecise but takes measurements quickly and efficiently, it is necessary to find further, alternative calibration processes that do not suffer from those disadvantages and are altogether more efficient.

SUMMARY OF THE INVENTION

It is accordingly an object of the invention to provide a method for correcting deviations of measured image data, which overcomes the hereinafore-mentioned disadvantages of the heretofore-known methods of this general type and which provides an efficient way of calibrating an image measuring unit that takes imprecise measurements by using an accurately measuring color measurement device.

With the foregoing and other objects in view there is provided, in accordance with the invention, a method for correcting deviations of measured image data of an image inspection system in which the image data are established both by a single measuring head and by an image measuring unit, by using a computer. The method comprises the steps of:
1. Measuring the color spectrums of color fields by using the single measuring head;
2. Measuring the color spectrums of color fields by using the image measuring unit;

3. Creating a respective color set by extracting the measured spectral color values form the color spectrums of the single measuring head and the image measuring unit;
4. Calculating the spectrums resulting from overprinting all possible color combinations each with a 0% up to 100% halftone for the single measuring head and the image measuring unit by using a color model and the respective color set;
5. Calculating the respective Lab color values for the single measuring head and the image measuring unit from the respective resultant spectrums of the single measuring head and the image measuring unit;
6. Establishing the deviations between the Lab color values of the single measuring head and the image measuring unit for specific supporting points in the Lab color space;
7. Adding the established deviations to the calculated Lab color values of the image measuring unit at these specific supporting points;
8. Creating an ICC profile out of the corrected Lab color values of the image measuring unit, which thus converts any imprecise Lab measured values of the image measuring unit into accurate Lab color values; and
9. Correcting the imprecisely measured Lab color values of the image measuring unit of the image inspection system using the created ICC profile.

This method reverts to the concept of calibrating an image measuring unit that takes imprecise measurements by using a single measuring head that takes accurate measurements as proposed in the prior art. However, the method differs from the calibration methods known from the prior art. In accordance with the present invention, the color spectrums of the same color fields are measured once using the image measuring unit that takes imprecise measurements and once using the single measurement head that takes accurate measurements. These color spectrums are then used to obtain a respective color set by extracting the measured colors. The resultant spectrums that are created by calculation of the overprinting of all possible color combinations of 0% to 100% halftone are calculated for these two color sets. Since the image measuring unit that is responsible for the actual monitoring of the print quality in terms of the achieved color values takes much more imprecise measurements than the single measuring head, deviations will occur between the two calculated Lab color values of the single measuring head and of the image measuring unit. These deviations are measured at specific supporting points in the Lab color space and form the basis for the calibration of the image measuring unit that takes imprecise measurements. For this purpose, the established deviations are added to the calculated Lab values of the image measuring unit at the supporting points to correct measured values of the image measuring unit at these supporting points. Then an ICC profile is created based on these Lab color values of the image measuring unit after they have been corrected by the established deviation because the ICC profile allows the correction of the image inspection system's image measuring unit that takes imprecise measurements to be more easily implemented. This means that the ICC profile is used to convert the Lab values of the image measuring unit as they have been measured in the context of color quality control into corrected Lab values.

Advantageous and thus preferred further developments of the method will become apparent from the associated dependent claims and from the description and the associated drawings.

In this context, a preferred further development of the method of the invention is that the color values are implemented in the form of color measurement strips with solid colors or in the form of color measurement strips with mixed colors on a printed substrate. The color fields to be measured for calibration purposes are usually implemented in the form of color measurement strips on a printed substrate. They are color measuring strips with solid colors, i.e. single-color color measurement strips. In addition to solid color measurement strips, i.e. single-color color measurement strips, mixed-color color measurement strips may be used in accordance with the method of the invention. These may also contain multiple colors printed on top of one another. The selection of the colors is arbitrary as long as the target color value of the resultant mixed color makes sense.

In this context, another preferred further development of the method of the invention is that the colors that are used are cyan, magenta, yellow, and black. In general, the method of the invention is for CMYK. However, the use of other colors, in particular spot colors, is of course likewise conceivable. These spot colors may then likewise be implemented as solid colors or mixed colors.

Another preferred further development of the method of the invention in this context is that the color set contains the averaged spectrums and additional parameters of the individual colors and of the paper, in particular the parameters trapping values, ultraviolet absorption, and the opacity of the colors.

On one hand, the color set that is used is formed of the established spectrums of the measured colors and on the other hand, additional parameters of the individual colors and of the paper may be saved in it. The more additional parameters there are in a color set, the more accurately it describes the established spectrums and improves the color model.

Another preferred further development of the method of the invention in this context is that the possible color combinations with their halftone area of 0% to 100% are subdivided in a resolution of 8 bits for every used color.

An 8-bits subdivision means that a halftone subdivision from 0% to 100% results in 256 halftone percentages for every used color. This occurs for all used colors, in the case of CMYK $256^4$ combinations. With this, all spectrums resulting from the overprint may be calculated.

Another preferred further development of the method of the invention in this context is that the applied color model calculates the overprint spectrums of the color combinations and then calculates the corresponding surface proportions of individual color, colors printed on top of one another, and paper for the halftone areas by using the Neugebauer equations.

The applied color model allows the spectrums to be calculated for all $256^4$ color combinations. All color combinations means all four used colors in all halftone percentages. The Neugebauer equations are used to calculate the corresponding area proportions for the halftone areas, wherein the respective proportions are calculated for the color combination and paper.

Another preferred further development of the method of the invention in this context is that the supporting points that are used result from specified Lab combinations such as 0 to 100 for L, minus 128 to 127 for A, and minus 128 to 127 for B in 4096 respective supporting points in the Lab color space.

In the method of the invention, the spectrums calculated by using the color model and the color set are represented in the Lab color space. In order to provide a sensible correction of the spectral values calculated from the measured color values in the Lab color space, the range to be considered in the Lab color space needs to be defined. A preferred range in the Lab color space in this context is the space with the coordinates from 0 to 100 for L and minus 128 to 127 for A and B. The supporting points in this defined color space correspond to those points in the color space in which measurements are to be taken. The e.g. 4096 used supporting points in the Lab color space result from the measured color values. However, since there are supporting points without measured values, the space outside the gamut, i.e. outside the Lab color space covered by the measured colors, is interpolated with appropriate values.

Another preferred further development of the method of the invention is that the correction of the deviations of the image unit taking imprecise measurements is carried out by a color management module in the printing press control unit.

Modern printing presses include a so-called color management module, which measures and evaluates the printed colors. This "Image Control" checks whether they correspond to the values to be expected as they are apparent from the settings of the prepress department. The deviations found in accordance with the method of the invention between the image measuring unit used for "Image Control" and the accurate measurements of the single measuring head are used by the color management module of the printing press control unit to correct the imprecise values of the image measuring unit.

Another preferred further development of the method of the invention is that the method is used to calculate Lab values for a measurement condition with UV excitation from measured values from a measurement without UV excitation.

If no measurement with stimulation by UV light is possible by using the image measuring unit as opposed to the single measuring head, the method of the invention may be used to convert measured values from the measurement without UV excitation to values for a measurement with UV excitation.

Another preferred further development of the method of the invention is that the method is used to calculate Lab values for a polarized measurement from measured values of a non-polarized measurement.

If the image measuring unit does not allow polarized measurement, for instance by using a polarization filter, but only non-polarized measurements as opposed to the single measuring head, the method of the invention may likewise be used to convert measured values from a non-polarized measurement to values for a polarized measurement.

The method and functionally advantageous further developments of the method will be described in more detail below with reference to the associated drawings and based on at least one preferred exemplary embodiment. In the drawings, mutually corresponding elements are designated by the same reference symbols.

Other features which are considered as characteristic for the invention are set forth in the appended claims.

Although the invention is illustrated and described herein as embodied in a method for correcting deviations of measured image data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 4:
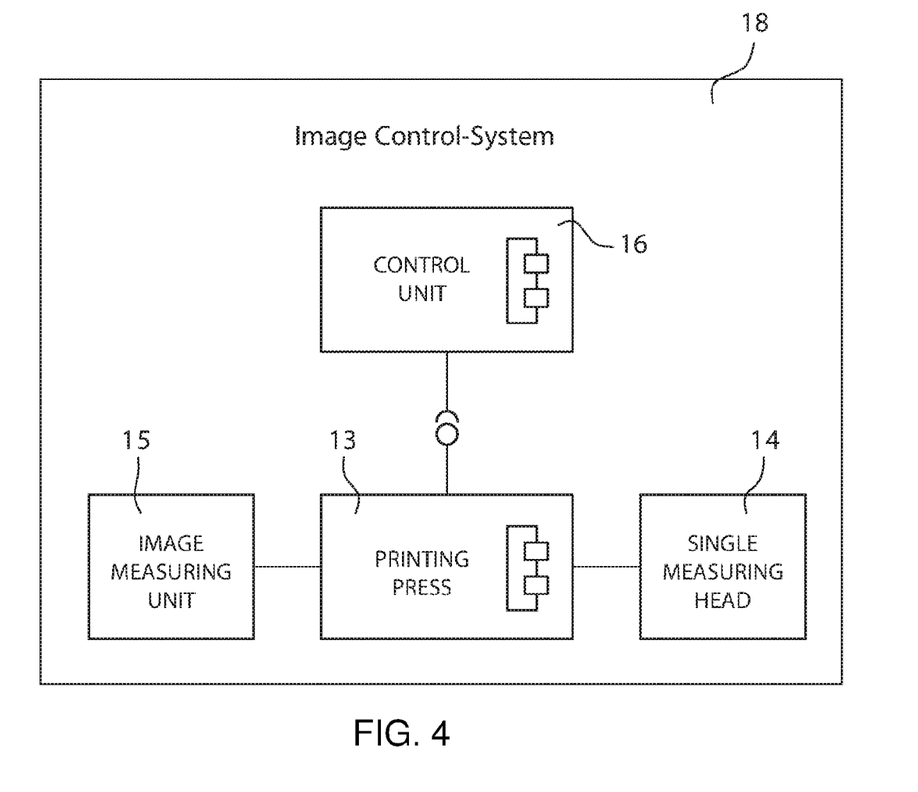
FIG. 4 is a block diagram representing the "Image Control" system.

Referring now to the figures of the drawings in detail and first, particularly, to FIG. 4 thereof, it is seen that a preferred progression of the method of the invention is as follows: an "Image Control" system 18, illustrated by way of example in FIG. 4, is operated by using a control unit or computer 16 of a printing press 13 or by using an external computer and checks whether the color values present in the printed image produced by the printing press 13 correspond to target values of the print job. For this purpose, it uses an image measuring unit 15 electronically scanning the printed image or a part of the printed image and comparing the data thereof to the color values to be expected. In general, the image measuring unit 15 is an RGB camera, but RGB cameras are usually not precise enough. In this invention spectral measuring systems are suitable for determining the printed color values are conceivable. Since the image measuring unit 15 needs to scan and process enormous amounts of data because the printing press 13 prints at a correspondingly high speed, again and again there will be deviations between the data established by the image measuring unit 15 and the actual printed color values. In order to detect and correct these deviations, the Image Control" system 18 includes a second measuring unit in the form of a single or individual measuring head. This single or individual measuring head 14 measures much more accurately than the image measuring unit 15, but is incapable of scanning larger areas of color values and can only measure individual measuring points, making it unsuitable for a general monitoring of the printed images but very suitable for taking individual measurements to be used for calibrating the image measuring unit 15.

Figure 5:
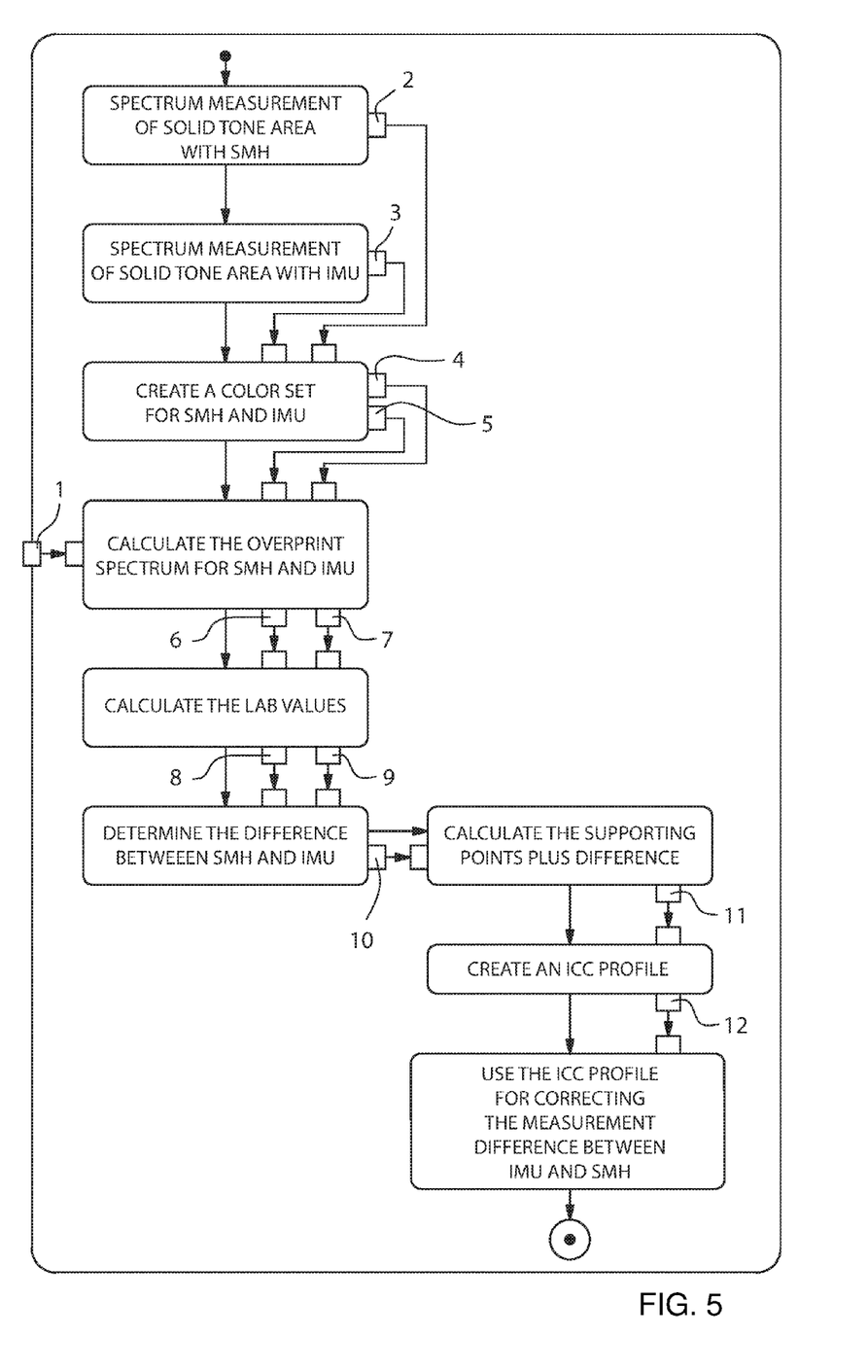
FIG. 5 is a flow chart of the method of the invention.

The resultant method of the invention is diagrammatically indicated in FIG. 5. In its preferred embodiment, measurements are taken at specific locations in a color measurement strip with a solid tone area. The measured data of the single measuring head (SMH) 14 are forwarded through a communication link to the control unit 16 running the "Image Control" 18. The single measuring head 14 may be disposed inside the printing press 13 or outside the printing press in the form of an external device with a corresponding data connection. In a second step, the same color measurement strip with the solid tone area is measured by using the image measuring unit (IMU) 15. The data are likewise forwarded to the "Image Control" 18. The "Image Control" 18 extracts a respective color set 4, 5 from the two measuring sets of the single measuring head 2 and of the image measuring unit 3.

Figure 1:
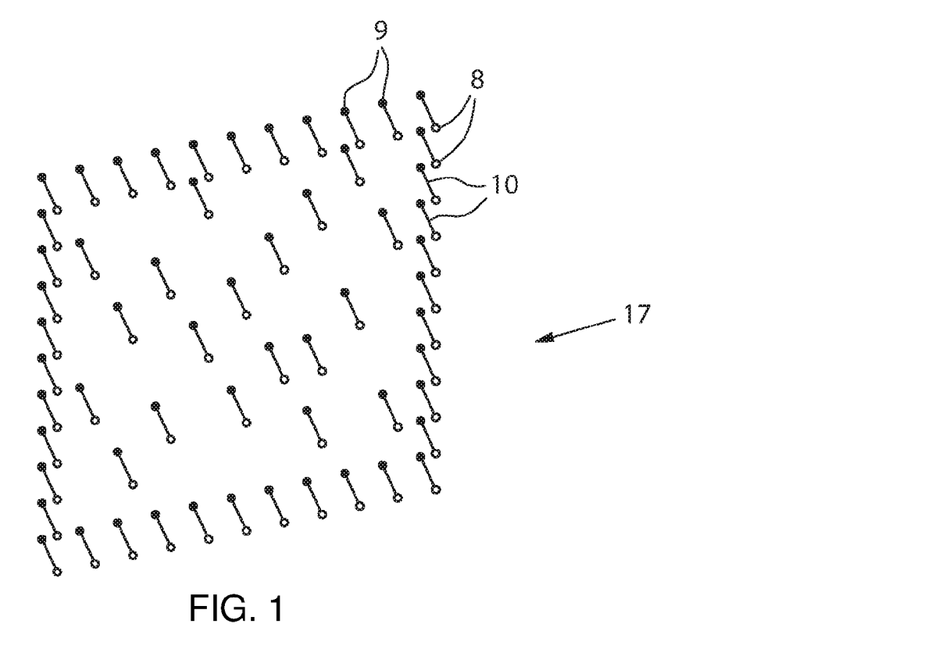
FIG. 1 is a diagram illustrating the calculated Lab values of the single measuring head and of the image measuring unit for cyan and magenta in the Lab color space.
Figure 2:
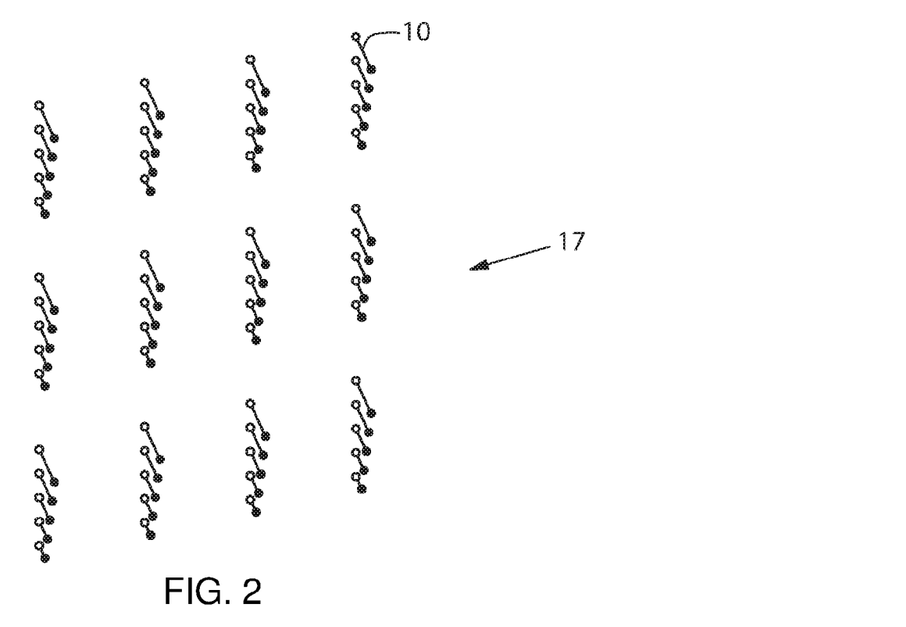
FIG. 2 is a diagram illustrating the deviation between the established Lab values of the single measuring head and of the image measuring unit in the Lab color space.

This color set contains the averaged spectrums and the additional parameters of the individual colors and of the paper. The next step is for all possible combinations of the used CMYK printing ink with a halftone area of 0% to 100% each to calculate spectrums 6, 7 resulting from overprinting all possible combinations. The halftone areas are resolved in an 8-bit width, resulting in 256 halftone values for every printing color from 0% to 100% halftone area. Since it is possible to overprint every halftone value of every printing color with all other halftone values of all printing colors, $256^4$ equaling 4,294,967,296 combinations are possible and are included in the resultant spectrums 6, 7. Usually a subset of these combinations is used. These resultant spectrums 6, 7 are calculated by the "Image Control" 18 for the measured values of both the single measuring head 2 and of the image measuring unit 3. This is done by using a suitable color model 1 which is known from the prior art, for instance in the form of German Patent Application No. DE 10 2010 009 226 A1, corresponding to U.S. Pat. No. 8,371,221, and by using the established color set for both the single measuring head 4 and the image measuring unit 5. Through the use of the color model 1, the overprint spectrums of the solid tone combinations are calculated and then the Neugebauer equation known from the prior art is used to calculate the corresponding surface proportions of individual color, overprint color, and paper for all halftone areas. The addition of the pre-calculated spectrums 6, 7 to these area proportions then leads to the respective resultant Lab data both of the single measuring head 8 and of the image measuring unit 9. The resultant Lab data 8, 9 then indicate the measured values in the Lab color space 17. This is shown by way of example in FIG. 1, which represents a combination of the colors cyan and magenta in the Lab color space, with both the calculated Lab values of the single measuring head 8 and the calculated Lab values of the image measuring unit 9 being present. Since these values are not identical due to the imprecise measurement of the image measuring unit 15, they deviate from one another at the corresponding coordinates. The deviation 10 is shown in the form of a connecting line. These deviations are extracted by forming the difference between the respective Lab values for the single measuring head 8 and for the image measuring unit 9.

Figure 3:
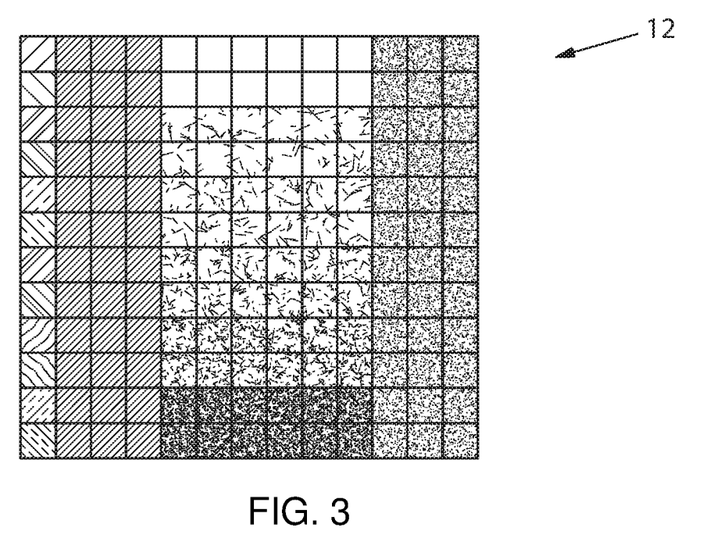
FIG. 3 is a diagram illustrating an example of an ICC profile.

Since the measurements do not cover the entire color space, the missing areas of the Lab color space 17 are added by interpolation. The used Lab color space 17 in general includes a range from 0 to 100 for L, from minus 128 to 127 for A and likewise from minus 128 to 127 for B in a total of e.g. $16^3$=4096 supporting points 11. The supporting points correspond to the measuring points in which the deviations of the spectral values 9 established by the image measuring unit are to be corrected in the Lab color space 17. At every one of these supporting points 11, the absolute value of the deviation 10 from the values of the single measuring head 8 is added to the values of the image measuring unit 15. This ensures the correction of the imprecise values of the image measuring unit 9 in terms of the accurate values of the single measuring head 8. Since this does not involve an automated correction of the measuring values of the image measuring unit 9 as it is nevertheless required to calibrate the image measuring unit 15, the corrected supporting points obtained in this way are converted into an ICC profile 12. An example of such an ICC profile 12 is shown in FIG. 3 and further information about ICC profiles can also be obtained from the official homepage of the International Color Consortium www.color.org. This ICC profile 12 may easily be processed by the "Image Control" to convert the Lab values of the image measuring unit 9 to corrected Lab values at a high speed. In this process, the imprecise image measuring unit 15 is calibrated by using the exact values of the single measuring head 8, allowing it to be used for a regular print job in the context of the "Image Control".

The following is a summary list of reference numerals and the corresponding structure used in the above description of the invention:

1 color model
2 color spectrum measured by single measuring head (EMK)
3 color spectrum measured by the image measuring unit (BME)
4 color set based on EMK data
5 color set based on BME data
6 overprint spectrum for a single measuring head (EMK)
7 overprint spectrum for an image measuring unit (BME)
8 Lab values for EMK data
9 Lab values for BME data
10 differential values between EMK and BME Lab values
11 calculated supporting points
12 ICC profile
13 printing press
14 single measuring head (EMK)
15 image measuring unit (BME)
16 control unit
17 Lab color space
18 "Image Control" system

The invention claimed is:

1. A method of correcting deviations of measured image data of an image inspection system, in which the image data are determined by both a single measuring head and an image measuring unit by using a computer, the method comprising the following steps:
   measuring color spectrums of color fields by using the single measuring head;
   measuring the color spectrums of color fields by using the image measuring unit;
   creating a respective color set by extracting the measured spectral color values from the color spectrums of the single measuring head and of the image measuring unit;
   calculating spectrums resulting from overprinting all possible color combinations, each with 0% to 100% halftone area, for the single measuring head and the image measuring unit by using a color model and the respective color set;
   calculating Lab color values for the single measuring head and for the image measuring unit based on the respective resultant spectrums of the single measuring head and of the image measuring unit;
   determining deviations between the Lab color values of the single measuring head and of the image measuring unit for specific supporting points in a Lab color space;
   adding the determined deviations to the Lab color values of the image measuring unit at the specific supporting points;
   creating an ICC profile based on corrected Lab color values of the image measuring unit, the ICC profile thus converting any desired imprecise Lab measured values of the image measuring unit into accurate Lab color values; and
   correcting imprecisely measured Lab color values of the image measuring unit of the image inspection system by using the created ICC profile.

2. The method according to claim 1, which further comprises implementing the color fields in the form of color measurement strips with solid tone colors or in the form of color measurement strips with mixed colors on a printed substrate.

3. The method according to claim 1, which further comprises using cyan, magenta, yellow, and black colors.

4. The method according to claim 1, wherein the color set includes averaged spectrums and additional parameters of individual colors and of paper.

5. The method according to claim 4, wherein the additional parameters are trapping value, ultra-violet absorption, and opacity of the colors.

6. The method according to claim 1, which further comprises subdividing possible color combinations with their halftone area of from 0% to 100% into a resolution of 8 bits for every used color.

7. The method according to claim 1, wherein the used color model calculates the overprint spectrums of the color combinations in order to calculate corresponding area proportions of single color, overprinted colors, and paper for the halftone areas by using Neugebauer equations.

8. The method according to claim 1, wherein the used supporting points result from specific Lab combinations.

9. The method according to claim 8, wherein the specific Lab combinations are from 0 to 100 for L, from −128 to 127 for A, and from −128 to 127 for B in 4096 respective supporting locations in the Lab color space.

10. The method according to claim 1, which further comprises adding by interpolation the supporting points of the Lab color space locations that are not covered by the measurements of the single measuring head and of the image measuring unit.

11. The method according to claim 1, wherein the computer is a printing press control unit, and a correction of the deviations of the image measuring unit that takes imprecise measurements is carried out by a color management module in the printing press control unit.

12. The method according to claim 1, which further comprises using the method for calculating Lab values for a measuring condition with UV excitation from measured values of a measurement without UV excitation.

13. The method according to claim 1, which further comprises using the method for calculating Lab values of a polarized measurement from measured values of a non-polarized measurement.

\* \* \* \* \*